Aug. 6, 1957  H. O. OLSON  2,801,513
ROTATING CUTTING ASSEMBLY
Filed Sept. 22, 1955
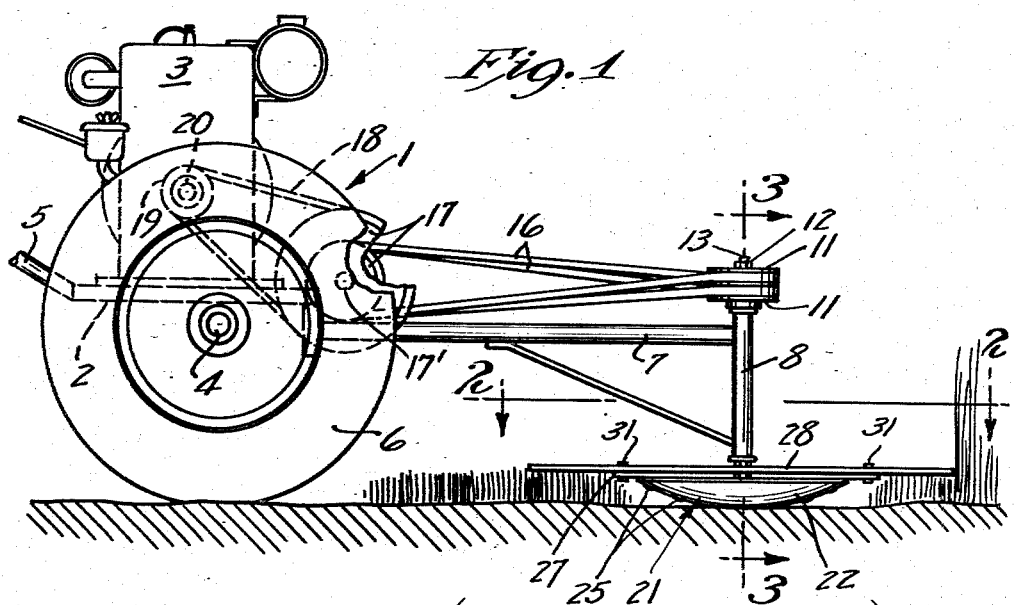
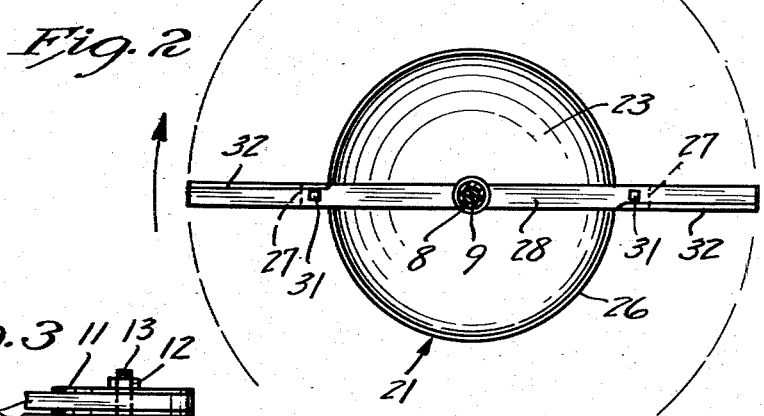
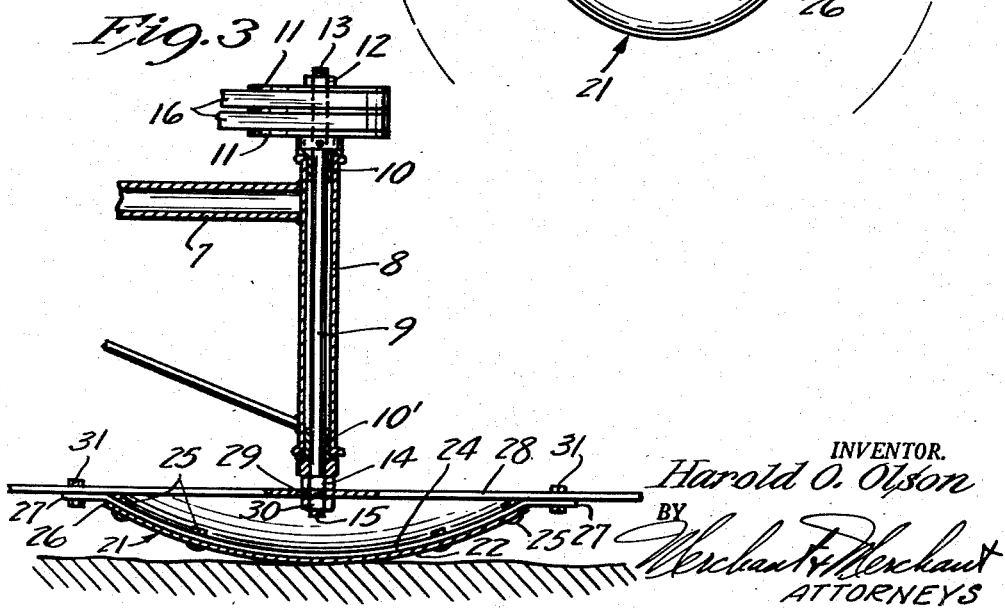
INVENTOR.
Harold O. Olson
BY
Merchant & Merchant
ATTORNEYS

United States Patent Office

2,801,513
ROTATING CUTTING ASSEMBLY
Harold O. Olson, Langdon, N. Dak.
Application September 22, 1955, Serial No. 535,816

1 Claim. (Cl. 56—295)

My invention relates generally to improvements in cutter heads for mowers and more particularly to cutter heads of the type having horizontally disposed cutter blades which rotate on a vertical axis.

The primary object of my invention is the provision of a device of the class above described which may be used on rough terrain with a minimum of damage to the radially projecting circumferentially spaced cutter blades normally utilized on structures of the type in question.

More specifically, an object of my invention is to provide a cutter head of the type in question having a central disc-like shoe with a convex ground-engaging lower surface. Such a shoe may be caused to rest upon the ground and in such a position will ride up and over rough terrain during cutting movements with a minimum of friction and with a minimum of damage to the radially projecting blades.

A still further object of my invention is the provision of a device of the class immediately above described which is relatively inexpensive to produce, which is highly efficient in its operation, which may be attached to and detached from a conventional mower with a minimum of time and effort, and which is rugged and durable.

The above and still further objects of my invention will become apparent from the following detailed specification, appended claim, and attached drawings.

Referring to the drawings, wherein like parts are indicated by like characters throughout the several views:

Fig. 1 is a view in side elevation of a conventional motor-driven cutter with my novel cutter head attached thereto, some parts being broken away;

Fig. 2 is an enlarged view partly in plan and partly in axial section as seen from the line 2—2 of Fig. 1; and Fig. 3 is an enlarged view in vertical section as seen substantially from the line 3—3 of Fig. 1.

Referring with greater particularity to the drawings, the numeral 1 indicates in its entirety a conventional garden implement tractor of the two-wheel type, the frame 2 and the motor 3 of which are mounted thereon for pivotal movements about the axle 4 in a conventional manner. A handle, not shown, may be assumed to form an extension of a rearwardly extended handlebar 5. Rigidly secured to the frame 2 and projecting forwardly therefrom intermediate the wheels 6 is a mounting arm 7 to the projected end of which is secured a tubular vertically disposed leg-like housing 8. A drive shaft 9 suitably journalled in bearings 10 and 10′ at opposite ends of the housing 8, has its opposite ends projecting outwardly therefrom.

On its upper end the drive shaft 9 is provided with suitable drive pulleys 11 by means of a nut 12 on the threaded extreme upper end 13 thereof. A nut 14 on the threaded lower end 15 of the drive shaft 9 locks drive shaft 9 against upward movements with respect to the housing 8. Conventional V-belts or the like 16 leading from relatively large pulleys 17 are shown as running over the pulleys 11. In a conventional manner motion is imparted to the pulleys 17 mounted on a jack shaft 17′ through a belt 18 running thereover and over a relatively smaller sheave or pulley 19 on an extended end of the drive shaft 20 of the motor 3.

My novel cutter head includes a disc-like shoe 21 having a convex ground-engaging lower surface 22. Preferably and as shown, the upper surface 23 of the shoe 21 is concave whereby to facilitate its manufacture from a sheet of pressed sheet steel or the like. An elongated anchoring bar 24 extends diametrically across the shoe 21 and is secured to the concave upper surface 23 by means of longitudinally spaced rivets or the like 25. The opposite ends of the anchoring bar 24 are bent into alignment with each other in a horizontal plane and project radially outwardly from the peripheral edge 26 of the shoe 21 to provide anchoring ears 27.

An elongated cutter-bar 28 has a central opening 29 for the reception of the screw thread equipped lower end 15 of the drive shaft 9. A nut 30, working against the thrust nut 14, secures the cutter-bar 28 to the drive shaft 9 for common rotation therewith. The opposite end portions of the cutter-bar 28 project radially outwardly from the peripheral edge 26 of the shoe 21 for a distance considerably greater than that of the anchoring ears 27. As shown, the cutter-bar 28 overlies the anchoring ears 27 and is detachably secured thereto by nut-equipped bolts or the like 31 which pass through suitable aligned openings therein not shown.

The shoe 21 and cutter-bar 28 are adapted to rotate in a clockwise direction, as indicated by the arrow in Fig. 2, and have their leading edges sharpened as at 32 to provide cutter blades.

The above-described combination and arrangement of parts not only facilitates attachment and detachment of the cutter-bar 28 from the shoe 21 for the purpose of replacement, sharpening and repair, but also greatly simplifies attachment of the cutter-bar 28 (either with the shoe 21 attached or detached therefrom) to the drive shaft 9. Furthermore, the convex lower surface 22 of the shoe 21 enables the entire cutter head to rest upon the ground at all times during forward cutting movements with a minimum of frictional engagement and with a minimum of striking engagement of the cutter blades 32 with stones, boulders, or the like, which project upwardly from the normal contour of the earth.

My invention has been thoroughly tested and found to be completely satisfactory for the accomplishment of the above objects, and while I have disclosed a preferred embodiment thereof, it should be obvious that same is capable of modification without departure from the scope of the appended claim.

What I claim is:

In a device of the class described, a horizontally disposed disc-like shoe having a convex ground-engaging lower surface and a concave upper surface, an anchoring bar extending diametrically of said shoe, the intermediate portion of said anchoring bar conforming in shape to the upper surface of said shoe and being rigidly secured thereto, the opposite ends of said anchoring bar projecting laterally outwardly from the peripheral edge of said shoe in a common plane and defining anchoring ears, an elongated cutter bar, said cutter bar having a central opening for the detachable reception of a vertically disposed drive shaft, and said box having means on opposite sides of said central opening in spaced relation to the opposite ends thereof for detachably securing same to said anchoring ears, the opposite end portions of said cutter bar projecting radially outwardly beyond said anchoring ears and defining cutter blades.

References Cited in the file of this patent
UNITED STATES PATENTS

| | | |
|---|---|---|
| 2,476,394 | Webb et al. | July 19, 1949 |
| 2,595,976 | Patterson | May 6, 1952 |
| 2,636,333 | Michaels | Apr. 28, 1953 |
| 2,707,363 | Beranek | May 3, 1955 |